US011773231B2

(12) United States Patent
Poeselt et al.

(10) Patent No.: US 11,773,231 B2
(45) Date of Patent: Oct. 3, 2023

(54) FOAMS BASED ON THERMOPLASTIC ELASTOMERS

(71) Applicant: BASF SE, Ludwigshafen am Rhein (DE)

(72) Inventors: Elmar Poeselt, Lemfoerde (DE); Peter Gutmann, Ludwigshafen (DE); Florian Tobias Rapp, Ludwigshafen (DE); Frank Prissok, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 146 days.

(21) Appl. No.: 17/047,166

(22) PCT Filed: Apr. 18, 2019

(86) PCT No.: PCT/EP2019/060123
§ 371 (c)(1),
(2) Date: Oct. 13, 2020

(87) PCT Pub. No.: WO2019/202090
PCT Pub. Date: Oct. 24, 2019

(65) Prior Publication Data
US 2021/0122894 A1 Apr. 29, 2021

(30) Foreign Application Priority Data
Apr. 20, 2018 (EP) .................................. 18168425

(51) Int. Cl.
| C08J 9/24 | (2006.01) |
| C08J 9/18 | (2006.01) |
| C08J 9/00 | (2006.01) |
| B29C 48/40 | (2019.01) |
| B29L 31/50 | (2006.01) |

(52) U.S. Cl.
CPC ............. *C08J 9/0061* (2013.01); *B29C 48/40* (2019.02); *C08J 9/18* (2013.01); *C08J 9/24* (2013.01); *B29C 2948/92704* (2019.02); *B29L 2031/504* (2013.01); *B29L 2031/507* (2013.01); *C08J 2201/03* (2013.01); *C08J 2203/06* (2013.01); *C08J 2300/22* (2013.01); *C08J 2375/04* (2013.01); *C08J 2425/06* (2013.01)

(58) Field of Classification Search
CPC ..... C08J 9/0061; C08J 9/18; C08J 9/24; C08J 2201/03; C08J 2203/06; C08J 2300/22; C08J 2375/04; C08J 2425/06; C08J 2207/00; C08J 2300/26; C08J 9/232; B29C 48/40; B29C 2948/92704; B29L 2031/504; B29L 2031/507; C08G 2110/0008; C08G 2110/0041; C08G 2110/0066; C08G 2350/00; C08G 2410/00; A43B 13/04

See application file for complete search history.

(56) References Cited

U.S. PATENT DOCUMENTS

| 2014/0151918 A1 | 6/2014 | Hartmann |
| 2015/0337102 A1 | 11/2015 | Schiller et al. |
| 2016/0297943 A1* | 10/2016 | Däschlein ............ B29C 44/3461 |
| 2017/0218154 A1 | 8/2017 | Huang et al. |

FOREIGN PATENT DOCUMENTS

| DE | 10 2011 108 744 A1 | 1/2013 | |
| DE | 102011108744 A1 * | 1/2013 | ......... B29C 44/1285 |
| EP | 1 979 401 B1 | 9/2010 | |
| EP | 3 053 732 A1 | 8/2016 | |
| EP | 3 109 280 A1 | 12/2016 | |
| EP | 2 872 309 B1 | 11/2017 | |
| WO | WO 94/20568 A1 | 9/1994 | |
| WO | WO 2007/082838 A1 | 7/2007 | |
| WO | WO 2010/010010 A1 | 1/2010 | |
| WO | WO-2010010010 A1 * | 1/2010 | ......... C08G 18/4238 |
| WO | WO 2013/153190 A1 | 10/2013 | |
| WO | WO 2014/150122 A2 | 9/2014 | |
| WO | WO 2014/150124 A1 | 9/2014 | |
| WO | WO 2016/146537 A1 | 9/2016 | |
| WO | WO 2017/030835 A1 | 2/2017 | |
| WO | WO 2018/087362 A1 | 5/2018 | |

OTHER PUBLICATIONS

Omnexus, Modulus of Elasticity, Special Chem, 2023 (Year: 2023).*
International Search Report dated May 31, 2019 in PCT/EP2019/060123, 2 pages.
International Preliminary Report on Patentability dated Jun. 9, 2020 in PCT/EP2019/060123, 8 pages.
H. Zweifel, "Plastics Additives Handbook" 5th Edition, Hanser Publishers, München, 2001, ([1]), pp. 97-139 and cover page.
Saechtling (Hg.), Kunststoff-Taschenbuch, 27. Auflage, Hanser-Verlag München 1998, Kap. 3.2.1 und 3.2.4, pp. 202-250.
Kunststoff-Handbuch Band 4, "Polystyrol", von Becker/Braun (1996).

* cited by examiner

*Primary Examiner* — Kara Boyle
(74) *Attorney, Agent, or Firm* — Grüneberg and Myers, PLLC

(57) ABSTRACT

The present invention relates to bead foams made of thermoplastic polyurethane and polystyrene produced moldings, to processes for the production of the bead foams and moldings, and also to the use of the moldings for shoe intermediate soles, shoe insoles, shoe combisoles, or cushioning elements for shoes.

14 Claims, No Drawings

FOAMS BASED ON THERMOPLASTIC ELASTOMERS

Bead foams (or foam beads), and also molded bodies produced therefrom, based on thermoplastic polyurethane or on other elastomers, are known (e.g. WO 94/20568, WO 2007/082838 A1, WO2017030835, WO 2013/153190 A1 WO2010010010) and can be used in many applications.

For the purposes of the present invention, the term "bead foam" or "foam beads" means a foam in bead form where the average diameter of the foam beads is from 0.2 to 20 mm, preferably 0.5 to 15 mm and in particular from 1 to 12 mm. In the case of non-spherical, e.g. elongate or cylindrical foam beads, diameter means the longest dimension.

There is in principle a requirement for bead foams with improved processability to give the corresponding molded bodies at temperatures that are as low as possible, with retention of advantageous mechanical properties. This is in particular relevant for the fusion processes that are in widespread current use where the energy for the fusion of the bead foams is introduced via an auxiliary medium such as steam, because better adhesive bonding is achieved here and at the same time impairment of the material or of the foam structure is thus reduced.

Adequate adhesive bonding or fusion of the foam beads is essential in order to obtain advantageous mechanical properties of the molding produced therefrom. If adhesive bonding or fusion of foam beads is inadequate, their properties cannot be fully utilized, and there is a resultant negative effect on the overall mechanical properties of the resultant molding. Similar considerations apply if there are points of weakness in the molded body. In such cases, mechanical properties are disadvantageous at the weakened points, the result being the same as mentioned above.

The expression "advantageous mechanical properties" is to be interpreted in respect of the intended applications. The application that is of most importance for the subject matter of the present invention is the application in the shoe sector, where the bead foams can be used for molded bodies for shoe constituents for which damping and/or cushioning is relevant, e.g. intermediate soles and inserts.

For the abovementioned applications in the shoe sector or sports shoe sector there is a requirement not only to obtain advantageous tensile and flexural properties of the molded bodies produced from the bead foams but also to have the capability to produce molded bodies which have rebound resilience, and also compression properties, advantageous for the specific application, together with minimized density. There is a relationship here between density and compression property, because the compression property is a measure of the minimal achievable density in a molding for the requirements of the application.

A molded body made of bead foam with a low level of compression properties will in principle require a higher density and therefore more material than a molded body made of bead foam with a high level of compression properties in order to generate similar final properties. This relationship also dictates the usefulness of a bead foam for specific applications. In this connection, bead foams that are particularly advantageous for applications in the shoe sector are those where the compression properties of the molded bodies produced from the bead foams are at a fairly low level for exposure to a small force while exhibiting deformation that is sufficient for the wearer in the usage region of the shoe.

Another problem is that in large-scale industrial production of bead foam by way of extrusion it is desirable to maximize throughput of material in order to produce the required quantities in the shortest possible time. However, rapid processing of the material here leads to material of lower quality, extending as far as instability and/or collapse of the resultant bead foams. There therefore remains a requirement for provision of bead foams with minimized production time.

An object underlying the present invention was therefore to provide bead foams suitable for the purposes described, which permit production of molded bodies inter alia for specific use in the shoe sector.

The object was achieved via a molded body made of bead foam, made of a composition (Z) comprising
a) from 70 to 95% by weight of thermoplastic polyurethane as component I
b) from 5 to 30% by weight of the styrene polymer as components II,
where the entirety of components I and II provides 100% by weight;
wherein the molded body is an intermediate sole for shoes, an insole for shoes or a cushioning element for shoes.

The thermoplastic polyurethanes used as component I are well known. They are produced by reaction of (a) isocyanates with (b) isocyanate-reactive compounds, for example polyols, with number-average molar mass from 500 g/mol to 100 000 g/mol (b1) and optionally chain extenders with molar mass from 50 g/mol to 499 g/mol (b2), optionally in the presence of (c) catalysts and/or (d) conventional auxiliaries and/or additional substances.

For the purposes of the present invention, preference is given to thermoplastic polyurethanes obtainable via reaction of (a) isocyanates with (b) isocyanate-reactive compounds, for example polyols (b1) with number-average molar mass from 500 g/mol to 100 000 g/mol and a chain extender (b2) with molar mass from 50 g/mol to 499 g/mol, optionally in the presence of (c) catalysts and/or (d) conventional auxiliaries and/or additional substances.

The components (a) isocyanate, (b) isocyanate-reactive compounds, for example polyol (b1), and, if used, chain extenders (b2) are also, individually or together, termed structural components. The structural components together with the catalyst and/or the customary auxiliaries and/or additional substances are also termed starting materials.

The molar ratios of the quantities used of the structural components (b) can be varied in order to adjust hardness and melt index of the thermoplastic polyurethanes, where hardness and melt viscosity increase with increasing content of chain extender in component (b) at constant molecular weight of the TPU, whereas melt index decreases.

For production of the thermoplastic polyurethanes, structural components (a) and (b), where (b) in a preferred embodiment also comprises chain extenders, are reacted in the presence of a catalyst (c) and optionally auxiliaries and/or additional substances in amounts such that the equivalence ratio of NCO groups of the diisocyanates (a) to the entirety of the hydroxy groups of component (b) is in the range from 1:0.8 to 1:1.3.

Another variable that describes this ratio is the index. The index is defined via the ratio of all of the isocyanate groups used during the reaction to the isocyanate-reactive groups, i.e. in particular the reactive groups of the polyol component and the chain extender. If the index is 1000, there is one active hydrogen atom for each isocyanate group. At indices above 1000, there are more isocyanate groups than isocyanate-reactive groups.

An equivalence ratio of 1:0.8 here corresponds to an index of 1250 (index 1000=1:1), and a ratio of 1:1.3 corresponds to an index of 770.

In a preferred embodiment, the index in the reaction of the abovementioned components is in the range from 965 to 1110, preferably in the range from 970 to 1110, particularly preferably in the range from 980 to 1030, and also very particularly preferably in the range from 985 to 1010 particularly preferably.

Preference is given in the invention to the production of thermoplastic polyurethanes where the weight-average molar mass (Mw) of the thermoplastic polyurethane is at least 60 000 g/mol, preferably at least 80 000 g/mol and in particular greater than 100 000 g/mol. The upper limit of the weight-average molar mass of the thermoplastic polyurethanes is very generally determined by processibility, and also by the desired property profile. The number-average molar mass of the thermoplastic polyurethanes is preferably from 80 000 to 300 000 g/mol. The average molar masses stated above for the thermoplastic polyurethane, and also for structural components (a) and (b), are the weight averages determined by means of gel permeation chromatography (e.g. in accordance with DIN 55672-1, March 2016 or a similar method).

Organic isocyanates (a) that can be used are aliphatic, cycloaliphatic, araliphatic and/or aromatic isocyanates.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylenedicyclohexyl 4,4'-, 2,4'- and/or 2,2'-diisocyanate (H12MDI).

Suitable aromatic diisocyanates are in particular naphthylene 1,5-diisocyanate (NDI), tolylene 2,4- and/or 2,6-diisocyanate (TDI), 3,3'-dimethyl-4,4'-diisocyanatobiphenyl (TODI), p phenylene diisocyanate (PDI), diphenylethane 4,4'-diisoyanate (EDI), methylenediphenyl diisocyanate (MDI), where the term MDI means diphenylmethane 2,2', 2,4'- and/or 4,4'-diisocyanate, 3,3'-dimethyldiphenyl diisocyanate, 1,2-diphenylethane diisocyanate and/or phenylene diisocyanate or H12MDI (methylenedicyclohexyl 4,4'-diisocyanate).

Mixtures can in principle also be used. Examples of mixtures are mixtures comprising and at least a further methylenediphenyl diisocyanate alongside methylenediphenyl 4,4'-diisocyanate. The term "methylenediphenyl diisocyanate" here means diphenylmethane 2,2'-, 2,4'- and/or 4,4'-diisocyanate or a mixture of two or three isomers. It is therefore possible to use by way of example the following as further isocyanate: diphenylmethane 2,2'- or 2,4'-diisocyanate or a mixture of two or three isomers. In this embodiment, the polyisocyanate composition can also comprise other abovementioned polyisocyanates.

Other examples of mixtures are polyisocyanate compositions comprising
4,4'-MDI and 2,4'-MDI, or
4,4'-MDI and 3,3'-dimethyl-4,4'-diisocyanatobiphenyl (TODI) or
4,4'-MDI and H12MDI (4,4'-methylene dicyclohexyl diisocyanate) or
4,4'-MDI and TDI; or
4,4'-MDI and 1,5-naphthylene diisocyanate (NDI).

In accordance with the invention, three or more isocyanates may also be used. The polyisocyanate composition commonly comprises 4,4'-MDI in an amount of from 2 to 50%, based on the entire polyisocyanate composition, and the further isocyanate in an amount of from 3 to 20%, based on the entire polyisocyanate composition.

Crosslinkers can be used as well, moreover, examples being the aforesaid higher-functionality polyisocyanates or polyols or else other higher-functionality molecules having a plurality of isocyanate-reactive functional groups. It is also possible within the realm of the present invention for the products to be crosslinked by an excess of the isocyanate groups used, in relation to the hydroxyl groups. Examples of higher-functionality isocyanates are triisocyanates, e.g. triphenylmethane 4,4',4"-triisocyanate, and also isocyanurates, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than two and preferably three or more hydroxyl groups.

The amount of crosslinkers here, i.e. of higher-functionality isocyanates and higher-functionality polyols (b), ought not to exceed 3% by weight, preferably 1% by weight, based on the overall mixture of components (a) to (d).

The polyisocyanate composition may also comprise one or more solvents. Suitable solvents are known to those skilled in the art. Suitable examples are nonreactive solvents such as ethyl acetate, methyl ethyl ketone and hydrocarbons.

Isocyanate-reactive compounds (b1) are those with molar mass that is preferably from 500 g/mol to 8000 g/mol, more preferably from 500 g/mol to 5000 g/mol, in particular from 500 g/mol to 3000 g/mol.

The statistical average number of hydrogen atoms exhibiting Zerewitinoff activity in the isocyanate-reactive compound (b) is at least 1.8 and at most 2.2, preferably 2; this number is also termed the functionality of the isocyanate-reactive compound (b), and states the quantity of isocyanate-reactive groups in the molecule, calculated theoretically for a single molecule, based on a molar quantity.

The isocyanate-reactive compound is preferably substantially linear and is one isocyanate-reactive substance or a mixture of various substances, where the mixture then meets the stated requirement.

The ratio of components (b1) and (b2) is varied in a manner that gives the desired hard-segment content, which can be calculated by the formula disclosed in PCT/EP2017/079049.

A suitable hard segment content here is below 60%, preferably below 40%, particularly preferably below 25%.

The isocyanate-reactive compound (b1) preferably has a reactive group selected from the hydroxy group, the amino groups, the mercapto group and the carboxylic acid group. Preference is given here to the hydroxy group and very particular preference is given here to primary hydroxy groups. It is particularly preferable that the isocyanate-reactive compound (b) is selected from the group of polyesterols, polyetherols and polycarbonatediols, these also being covered by the term "polyols".

Suitable polymers in the invention are homopolymers, for example polyetherols, polyesterols, polycarbonatediols, polycarbonates, polysiloxanediols, polybutadienediols, and also block copolymers, and also hybrid polyols, e.g. poly (ester/amide). Preferred polyetherols in the invention are polyethylene glycols, polypropylene glycols, polytetramethylene glycol (PTHF), polytrimethylene glycol. Preferred polyester polyols are polyadipates, polysuccinic esters and polycaprolactones.

In another embodiment, the present invention also provides a thermoplastic polyurethane as described above where the polyol composition comprises a polyol selected from the group consisting of polyetherols, polyesterols, polycaprolactones and polycarbonates.

Examples of suitable block copolymers are those having ether and ester blocks, for example polycaprolactone having polyethylene oxide or polypropylene oxide end blocks, and also polyethers having polycaprolactone end blocks. Preferred polyetherols in the invention are polyethylene glycols, polypropylene glycols, polytetramethylene glycol (PTHF) and polytrimethylene glycol. Preference is further given to polycaprolactone.

In a particularly preferred embodiment, the molar mass Mn of the polyol used is in the range from 500 g/mol to 4000 g/mol, preferably in the range from 500 g/mol to 3000 g/mol.

Another embodiment of the present invention accordingly provides a thermoplastic polyurethane as described above where the molar mass Mn of at least one polyol comprised in the polyol composition is in the range from 500 g/mol to 4000 g/mol.

It is also possible in the invention to use mixtures of various polyols.

An embodiment of the present invention uses, for the production of the thermoplastic polyurethane, at least one polyol composition comprising at least polytetrahydrofuran. The polyol composition in the invention can also comprise other polyols alongside polytetrahydrofuran.

Materials suitable by way of example as other polyols in the invention are polyethers, and also polyesters, block copolymers, and also hybrid polyols, e.g. poly(ester/amide). Examples of suitable block copolymers are those having ether and ester blocks, for example polycaprolactone having polyethylene oxide or polypropylene oxide end blocks, and also polyethers having polycaprolactone end blocks. Preferred polyetherols in the invention are polyethylene glycols and polypropylene glycols. Preference is further given to polycaprolactone as other polyol.

Examples of suitable polyols are polyetherols such as polytrimethylene oxide and polytetramethylene oxide.

Another embodiment of the present invention accordingly provides a thermoplastic polyurethane as described above where the polyol composition comprises at least one polytetrahydrofuran and at least one other polyol selected from the group consisting of another polytetramethylene oxide (PTHF), polyethylene glycol, polypropylene glycol and polycaprolactone.

In a particularly preferred embodiment, the number-average molar mass Mn of the polytetrahydrofuran is in the range from 500 g/mol to 5000 g/mol, more preferably in the range from 550 to 2500 g/mol, particularly preferably in the range from 650 to 2000 g/mol and very preferably in the range from 650 to 1400 g/mol.

The composition of the polyol composition can vary widely for the purposes of the present invention. By way of example, the content of the first polyol, preferably of polytetrahydrofuran, can be in the range from 15% to 85%, preferably in the range from 20% to 80%, more preferably in the range from 25% to 75%.

The polyol composition in the invention can also comprise a solvent. Suitable solvents are known per se to the person skilled in the art.

Insofar as polytetrahydrofuran is used, the number-average molar mass Mn of the polytetrahydrofuran is by way of example in the range from 500 g/mol to 5000 g/mol, preferably in the range from 500 to 3000 g/mol. It is further preferable that the number-average molar mass Mn of the polytetrahydrofuran is in the range from 500 to 1400 g/mol.

The number-average molar mass Mn here can be determined as mentioned above by way of gel permeation chromatography.

Another embodiment of the present invention also provides a thermoplastic polyurethane as described above where the polyol composition comprises a polyol selected from the group consisting of polytetrahydrofurans with number-average molar mass Mn in the range from 500 g/mol to 5000 g/mol.

It is also possible in the invention to use mixtures of various polytetrahydrofurans, i.e. mixtures of polytetrahydrofurans with various molar masses.

Chain extenders (b2) used are preferably aliphatic, araliphatic, aromatic and/or cycloaliphatic compounds with a molar mass from 50 g/mol to 499 g/mol, preferably having 2 isocyanate-reactive groups, also termed functional groups. Preferred chain extenders are diamines and/or alkanediols, more preferably alkanediols having from 2 to 10 carbon atoms, preferably having from 3 to 8 carbon atoms in the alkylene moiety, these more preferably having exclusively primary hydroxy groups.

Preferred embodiments use chain extenders (c), these being preferably aliphatic, araliphatic, aromatic and/or cycloaliphatic compounds with molar mass from 50 g/mol to 499 g/mol, preferably having 2 isocyanate-reactive groups, also termed functional groups.

It is preferable that the chain extender is at least one chain extender selected from the group consisting of ethylene 1,2-glycol, propane-1,2-diol, propane-1,3-diol, butane-1,4-diol, butane-2,3-diol, pentane-1,5-diol, hexane-1,6-diol, diethylene glycol, dipropylene glycol, cyclohexane-1,4-diol, cyclohexane-1,4-dimethanol, neopentyl glycol and hydroquinone bis(beta-hydroxyethyl) ether (HQEE). Particularly suitable chain extenders are those selected from the group consisting of 1,2-ethanediol, propane-1,3-diol, butane-1,4-diol and hexane-1,6-diol, and also mixtures of the above-mentioned chain extenders. Examples of specific chain extenders and mixtures are disclosed inter alia in PCT/EP2017/079049.

In preferred embodiments, catalysts (c) are used with the structural components. These are in particular catalysts which accelerate the reaction between the NCO groups of the isocyanates (a) and the hydroxy groups of the isocyanate-reactive compound (b) and, if used, the chain extender.

Examples of catalysts that are further suitable are organometallic compounds selected from the group consisting of organyl compounds of tin, of titanium, of zirconium, of hafnium, of bismuth, of zinc, of aluminum and of iron, examples being organyl compounds of tin, preferably dialkyltin compounds such as dimethyltin or diethyltin, or tin-organyl compounds of aliphatic carboxylic acids, preferably tin diacetate, tin dilaurate, dibutyltin diacetate, dibutyltin dilaurate, bismuth compounds, for example alkylbismuth compounds or the like, or iron compounds, preferably iron(MI) acetylacetonate, or the metal salts of carboxylic acids, e.g. tin(II) isooctoate, tin dioctoate, titanic esters or bismuth(III) neodecanoate. Particularly preferred catalysts are tin dioctoate, bismuth decanoate and titanic esters. Quantities preferably used of the catalyst (d) are from 0.0001 to 0.1 part by weight per 100 parts by weight of the isocyanate-reactive compound (b). Other compounds that can be added, alongside catalysts (c), to the structural components (a) to (b) are conventional auxiliaries (d). Mention may be made by way of example of surface-active substances, fillers, flame retardants, nucleating agents, oxidation stabilizers, lubricating and demolded body aids, dyes and pigments, and optionally stabilizers, preferably with respect to hydrolysis, light, heat or discoloration, inorganic and/or organic fillers, reinforcing agents and/or plasticizers.

Suitable dyes and pigments are listed at a later stage below.

Stabilizers for the purposes of the present invention are additives which protect a plastic or a plastics mixture from damaging environmental effects. Examples are primary and secondary antioxidants, sterically hindered phenols, hindered amine light stabilizers, UV absorbers, hydrolysis stabilizers, quenchers and flame retardants. Examples of commercially available stabilizers are found in Plastics Additives Handbook, 5th edn., H. Zweifel, ed., Hanser Publishers, Munich, 2001 ([1]), pp. 98-136.

The thermoplastic polyurethanes may be produced batchwise or continuously by the known processes, for example using reactive extruders or the belt method by the "one-shot" method or the prepolymer process, preferably by the "one-shot" method. In the "one-shot" method, the components (a), (b) to be reacted, and in preferred embodiments also the chain extender in components (b), (c) and/or (d), are mixed with one another consecutively or simultaneously, with immediate onset of the polymerization reaction. The TPU can then be directly pelletized or converted by extrusion to lenticular pellets. In this step, it is possible to achieve concomitant incorporation of other adjuvants or other polymers.

In the extruder process, structural components (a), (b), and in preferred embodiments also (c), (d) and/or (e), are introduced into the extruder individually or in the form of mixture and reacted, preferably at temperatures of from 100° C. to 280° C., preferably from 140° C. to 250° C. The resultant polyurethane is extruded, cooled and pelletized, or directly pelletized by way of an underwater pelletizer in the form of lenticular pellets.

In a preferred process, a thermoplastic polyurethane is produced from structural components isocyanate (a), isocyanate-reactive compound (b) including chain extender, and in preferred embodiments the other raw materials (c) and/or (d) in a first step, and the additional substances or auxiliaries are incorporated in a second extrusion step.

It is preferable to use a twin-screw extruder, because twin-screw extruders operate in force-conveying mode and thus permit greater precision of adjustment of temperature and quantitative output in the extruder. Production and expansion of a TPU can moreover be achieved in a reactive extruder in a single step or by way of a tandem extruder by methods known to the person skilled in the art.

The styrene polymers mentioned as component II are standard polystyrene. The term "standard polystyrene" here preferably comprises atactic, syndiotactic or isotactic polystyrene, particularly preferably atactic polystyrene.

The glass transition temperature of atactic polystyrene of the invention, which is amorphous, is in the range of 100° C.±20° C. (according to DIN EN ISO 11357-1, February 2017/DIN EN ISO 11357-2, July 2014, Inflection-point method). Syndiotactic and isotactic polystyrene of the invention are respectively semicrystalline and have a melting point in the range of respectively 270° C. at 240° C. (DIN EN ISO 11357-1; February 2017/DIN EN ISO 11357-3, April 2013, W Peak melting temperature).

The modulus of elasticity in tension of the polystyrenes used is above 2500 (DIN EN ISO 527-1/2, June 2012).

The production and processing of the polystyrenes of the invention is described extensively in the literature, for example in Kunststoff-Handbuch Band 4, "Polystyrol" [Plastics handbook, vol. 4, "Polystyrene"], by Becker/Braun (1996).

Commercially available materials can also be used, for example PS 158 K (BASF SE), PS 148 H Q (BASF SE), STYROLUTION PS 156 F, STYROLUTION PS 158N/L, STYROLUTION PS 168N/L, STYROLUTION PS 153F, SABIC PS 125, SABIC PS 155, SABIC PS 160.

As stated above, the composition Z comprises from 70 to 95% by weight of thermoplastic polyurethane as component I from 5 to 30% by weight of the styrene polymer as component II, where the entirety of components I and II provides 100% by weight.

The composition Z preferably comprises from 80 to 90% by weight of thermoplastic polyurethane as component I from 10 to 20% by weight of the styrene polymer as component II, where the entirety of components I and II provides 100% by weight.

For the purposes of the present invention, the composition Z can by way of example comprise from 5 to 20% by weight of the styrene polymer as component II, or from 5 to 15% by weight of the styrene polymer as component II.

For the purposes of the present invention, the composition Z can by way of example comprise from 80 to 92.5% by weight of thermoplastic polyurethane as component I and from 7.5 to 20% by weight of the styrene polymer as component II, preferably from 80 to 90% by weight of thermoplastic polyurethane as component I and from 10 to 20% by weight of the styrene polymer as component II, more preferably from 80 to 85% by weight of thermoplastic polyurethane as component I and from 15 to 20% by weight of the styrene polymer as component II, where the entirety of the components I and II in each case provides 100% by weight.

The unexpanded starting material, the composition Z, required for the production of the bead foam is produced in a manner known per se from the individual thermoplastic elastomers (TPE-1) and (TPE-2), and also optionally other components.

Suitable processes are by way of example conventional mixing processes in a kneader or an extruder.

The unexpanded polymer mixture of the composition Z required for the production of the bead foam is produced in a known manner from the individual components and also optionally other components, for example processing aids, stabilizers, compatibilizers or pigments. Examples of suitable processes are conventional mixing processes with the aid of a kneader, in continuous or batchwise mode, or with the aid of an extruder, for example a corotating twin-screw extruder.

When compatibilizers or auxiliaries are used, examples being stabilizers, these can also be incorporated into the components before production of the latter has ended. The individual components are usually combined before the mixing process, or metered into the mixing apparatus. When an extruder is used, all of the components are metered into the intake and conveyed together into the extruder, or individual components are added by way of an ancillary feed system (but not normally in the case of foams, because this part of the extruder is not sufficiently leakproof for that purpose).

The processing takes place at a temperature at which the components are present in a plastified state. The temperature depends on the softening or melting ranges of the components, but must be below the decomposition temperature of each component. Additives such as pigments or fillers or other abovementioned conventional auxiliaries (d) are incorporated in solid state rather than in molten state.

There are other possible embodiments here employing widely used methods, where the processes used in the production of the starting materials can be directly integrated into the production procedure. By way of example, it would be possible, when the belt process is used, to introduce the second elastomer (TPE-2), and also fillers or dyes, directly at the end of the belt where the material is fed into an extruder in order to obtain lenticular pellets.

Some of the abovementioned conventional auxiliaries (d) can be added to the mixture in this step.

The bulk density of the bead foams of the invention is generally from 50 g/l to 200 g/l, preferably from 60 g/l to 180 g/l, particularly preferably from 80 g/l to 150 g/l. Bulk density is measured by a method based on DIN ISO 697, but determination of the above values differs from the standard in that a vessel with volume of 10 l is used instead of a vessel with volume of 0.5 l. because a measurement using only a volume of 0.5 l is too imprecise specifically for foam beads with low density and high mass.

As stated above, the diameter of the foam beads is from 0.5 to 30 mm, preferably from 1 to 15 mm and in particular from 3 to 12 mm. In the case of non-spherical, e.g. elongate or cylindrical foam beads, diameter means the longest dimension.

The bead foams can be produced by the known processes widely used in the prior art via
i. provision of a composition (Z) of the invention;
ii. impregnation of the composition with a blowing agent under pressure;
iii. expansion of the composition by means of pressure decrease.

The quantity of blowing agent is preferably from 0.1 to 40 parts by weight, in particular from 0.5 to 35 parts by weight and particularly preferably from 1 to 30 parts by weight, based on 100 parts by weight of the quantity used of the composition (Z).

One embodiment of the abovementioned process comprises
i. provision of a composition (Z) of the invention in the form of pellets;
ii. impregnation of the pellets with a blowing agent under pressure;
iii. expansion of the pellets by means of pressure decrease.

Another embodiment of the abovementioned process comprises another step:
i. provision of a composition (Z) of the invention in the form of pellets;
ii. impregnation of the pellets with a blowing agent under pressure;
iii. reduction of the pressure to atmospheric pressure without foaming of the pellets, optionally via prior temperature reduction.
iv. foaming of the pellets via temperature increase.

It is preferable that the average minimal diameter of the pellets is from 0.2 to 10 mm (determined by way of 3D evaluation of the pellets, e.g. by way of dynamic image analysis with use of a PartAn 3D optical measuring apparatus from Microtrac).

The average mass of the individual pellets is generally in the range from 0.1 to 50 mg, preferably in the range from 4 to 40 mg and particularly preferably in the range from 7 to 32 mg. This average mass of the pellets (particle weight) is determined as arithmetic average via three weighing procedures each using ten pellets.

One embodiment of the abovementioned process comprises the impregnation of the pellets with a blowing agent under pressure, followed by expansion of the pellets in step (ii) and (iii):
ii. impregnation of the pellets in the presence of a blowing agent under pressure at elevated temperatures in a suitable, closed reaction vessel (e.g. autoclave)
iii. sudden depressurization without cooling.

The impregnation in step ii here can take place in the presence of water, and also optionally suspension auxiliaries, or exclusively in the presence of the blowing agent and in the absence of water.

Examples of suitable suspension auxiliaries are water-insoluble inorganic stabilizers, for example tricalcium phosphate, magnesium pyrophosphate, metal carbonates, and also polyvinyl alcohol and surfactants, for example sodium dodecylarylsulfonate. Quantities usually used of these are from 0.05 to 10% by weight, based on the composition of the invention.

The impregnation temperatures depend on the selected pressure and are in the range from 100 to 200° C., the pressure in the reaction vessel being from 2 to 150 bar, preferably from 5 to 100 bar, particularly preferably from 20 to 60 bar, the impregnation time being generally from 0.5 to 10 hours.

The conduct of the process in suspension is known to the person skilled in the art and described by way of example extensively in WO2007/082838.

When the process is carried out in the absence of the blowing agent, care must be taken to avoid aggregation of the polymer pellets.

Suitable blowing agents for carrying out the process in a suitable closed reaction vessel are by way of example organic liquids and gases which are in the gas state under the processing conditions, for example hydrocarbons or inorganic gases or mixtures of organic liquids or, respectively, gases with inorganic gases, where these can likewise be combined.

Examples of suitable hydrocarbons are halogenated or non-halogenated, saturated or unsaturated aliphatic hydrocarbons, preferably non-halogenated, saturated or unsaturated aliphatic hydrocarbons.

Preferred organic blowing agents are saturated, aliphatic hydrocarbons, in particular those having from 3 to 8 C atoms, for example butane or pentane.

Suitable inorganic gases are nitrogen, air, ammonia or carbon dioxide, preferably nitrogen or carbon dioxide, or a mixture of the abovementioned gases.

In another embodiment, the impregnation of the pellets with a blowing agent under pressure comprises processes followed by expansion of the pellets in step (ii) and (iii):
ii. impregnation of the pellets in the presence of a blowing agent under pressure at elevated temperatures in an extruder
iii. pelletization, under conditions that prevent uncontrolled foaming, of the melt emerging from the extruder.

Suitable blowing agents in this process version are volatile organic compounds with boiling point from −25 to 150° C. at atmospheric pressure, 1013 mbar, in particular from −10 to 125° C. Materials with good suitability are hydrocarbons (preferably halogen-free), in particular C4-10-alkanes, for example the isomers of butane, of pentane, of hexane, of heptane, and of octane, particularly preferably isopentane. Other possible blowing agents are moreover bulkier compounds such as alcohols, ketones, esters, ethers and organic carbonates.

In the step (ii) here, the composition is mixed in an extruder, with melting, under pressure, with the blowing agent which is introduced into the extruder. The mixture comprising blowing agent is extruded and pelletized under pressure, preferably using counterpressure controlled to a moderate level (an example being underwater pelletization). The melt strand foams here, and pelletization gives the foam beads.

The conduct of the process via extrusion is known to the person skilled in the art and described by way of example extensively in WO2007/082838, and also in WO 2013/153190 A1.

Extruders that can be used are any of the conventional screw-based machines, in particular single-screw and twin-screw extruders (e.g. ZSK from Werner & Pfleiderer), co-kneaders, Kombiplast machines, MPC kneading mixers, FCM mixers, KEX kneading screw-extruders and shear-roll extruders of the type described by way of example in Saechtling (ed.), Kunststoff-Taschenbuch [Plastics handbook], 27th edn., Hanser-Verlag, Munich 1998, chapters 3.2.1 and 3.2.4. The extruder is usually operated at a temperature at which the composition (Z1) takes the form of melt, for example at from 120° C. to 250° C., in particular from 150 to 210° C., and at a pressure, after addition of the blowing agent, of from 40 to 200 bar, preferably from 60 to 150 bar, particularly preferably from 80 to 120 bar, in order to ensure homogenization of the blowing agent with the melt.

The process here can be conducted in an extruder or in an arrangement of one or more extruders. It is thus possible by way of example that the components are melted and blended, with injection of a blowing agent, in a first extruder. In the second extruder, the impregnated melt is homogenized and the temperature and/or the pressure is adjusted. If, by way of example, three extruders are combined with one another, it is equally possible that the mixing of the components and the injection of the blowing agent are divided over two different process components. If, as is preferred, only one extruder is used, all of the process steps—melting, mixing, injection of the blowing agent, homogenization and adjustment of the temperatures and/or of the pressure—are carried out in a single extruder.

Alternatively, in the methods described in WO2014150122 or WO2014150124 A1 the corresponding bead foam, optionally indeed already colored, can be produced directly from the pellets in that the corresponding pellets are saturated by a supercritical liquid and are removed from the supercritical liquid, and this is followed by
(i) immersion of the product in a heated fluid or
(ii) irradiation of the product with high-energy radiation (e.g. infrared radiation or microwave radiation).

Examples of suitable supercritical liquids are those described in WO2014150122 or, e.g. carbon dioxide, nitrogen dioxide, ethane, ethylene, oxygen or nitrogen, preferably carbon dioxide or nitrogen.

The supercritical liquid here can also comprise a polar liquid with Hildebrand solubility parameter equal to or greater than 9 MPa-1/2.

It is possible here that the supercritical fluid or the heated fluid also comprises a colorant, thus producing a colored, foamed product.

The present invention further provides a molded body produced from the bead foams of the invention.

The corresponding molded bodies can be produced by methods known to the person skilled in the art.

A preferred process here for the production of a foam molding comprises the following steps:
(i) introduction of the foam beads into an appropriate mold,
(ii) fusion of the foam beads from step (i).

The fusion in step (ii) preferably takes place in a closed mold where the fusion can be achieved via steam, hot air (e.g. as described in EP1979401B1) or high-energy radiation (microwaves or radio waves).

The temperature during the fusion of the bead foam is preferably below or close to the melting point of the polymer from which the bead foam was produced. For widely used polymers, the temperature for the fusion of the bead foam is accordingly from 100° C. to 180° C., preferably from 120 to 150° C.

Temperature profiles/residence times can be determined individually here, e.g. on the basis of the processes described in US20150337102 or EP2872309B1.

The fusion by way of high-energy radiation generally takes place in the frequency range of microwaves or radio waves, optionally in the presence of water or of other polar liquids, e.g. microwave-absorbing hydrocarbons having polar groups (examples being esters of carboxylic acids and of diols or triols, other examples being glycols and liquid polyethylene glycols), and can be achieved by a method based on the processes described in EP3053732A or WO16146537.

For the fusion by high-frequency electromagnetic radiation, the foam beads can preferably be wetted with a polar liquid that is suitable for absorbing the radiation, for example in proportions of from 0.1 to 10% by weight, preferably in proportions of 1 to 6% by weight, based on the foam beads used. For the purposes of the present invention, it is also possible to achieve the fusion of the foam beads by high-frequency electromagnetic radiation without use of a polar liquid. The thermal bonding of the foam beads is achieved by way of example in a mold by means of high-frequency electromagnetic radiation, in particular by means of microwaves. The term high-frequency denotes electromagnetic radiation with frequencies of at least 20 MHz, for example of at least 100 MHz. Electromagnetic radiation in the frequency range from 20 MHz to 300 GHz, for example from 100 MHz to 300 GHz, is generally used. It is preferable to use microwaves in the frequency range from 0.5 to 100 GHz, particularly preferably from 0.8 to 10 GHz, and radiation times from 0.1 to 15 minutes. It is preferable that the frequency range of the microwaves is adjusted to suit the absorption behavior of the polar liquid, or that, in a reversed procedure, the polar liquid is selected on the basis of absorption behavior corresponding to the frequency range of the microwave equipment used. Suitable processes are described by way of example in WO 2016/146537A1.

As stated above, the bead foam can also comprise colorants. Colorants can be added here in various ways.

In one embodiment, the bead foams produced can be colored after production. In this case, the corresponding bead foams are brought into contact with a carrier liquid comprising a colorant, the polarity of the carrier liquid (CL) being suitable to achieve sorption of the carrier liquid into the bead foam. The method can be based on the methods described in the EP application with application Ser. No. 17/198,591.4.

Examples of suitable colorants are inorganic or organic pigments. Examples of suitable natural or synthetic inorganic pigments are carbon black, graphite, titanium oxides, iron oxides, zirconium oxides, cobalt oxide compounds, chromium oxide compounds, copper oxide compounds. Examples of suitable organic pigments are azo pigments and polycyclic pigments.

In another embodiment, the color can be added during production of the bead foam. By way of example, the colorant can be added into the extruder during production of the bead foam by way of extrusion. Alternatively, material that has already been colored can be used as starting material for production of the bead foam which is extruded or—is expanded in the closed vessel by the abovementioned processes.

It is moreover possible that in the process described in WO2014150122 the supercritical liquid or the heated liquid comprises a colorant.

As stated above, the moldings of the invention have advantageous properties for the abovementioned applications in the shoe or sports shoe sector requirement.

The tensile properties and compression properties of the molded bodies produced from the bead foams are characterized in that the tensile strength is above 600 kPa (DIN EN ISO 1798, April 2008), elongation at break is above 100% (DIN EN ISO 1798, April 2008), and compressive stress at 10% compression is above 15 kPa (on the basis of DIN EN ISO 844, November 2014; the difference from the standard consists in the height of the sample, 20 mm instead of 50 mm, and the resultant adjustment of the test velocity to 2 mm/min).

The rebound resilience of the molded bodies produced from the bead foams is above 55% (by a method based on DIN 53512, April 2000; the deviation from the standard is the sample height, which should be 12 mm, but in this test is 20 mm in order to avoid transmission of energy beyond the sample and measurement of the substrate).

As stated above, there is a relationship between the density and compression properties of the resultant molded bodies. The density of the moldings produced is advantageously from 75 to 375 kg/m$^3$, preferably from 100 to 300 kg/m$^3$, particularly preferably from 150 to 200 kg/m$^3$ (DIN EN ISO 845, October 2009).

The ratio of the density of the molding to the bulk density of the bead foams of the invention here is generally from 1.5 to 2.5, preferably from 1.8 to 2.0.

The invention further provides the use of a bead foam of the invention for the production of a molded body for shoe intermediate soles, shoe insoles, or shoe combisoles. Furthermore, the bead foam of the invention can for the production of a molded body for bicycle saddles, bicycle tires, damping elements, cushioning, mattresses, underlays, grips, protective films, in components in the automobile-interior sector or automobile-exterior sector, balls and sports equipment, or as floorcovering, in particular for sports surfaces, running tracks, sports halls, children's play areas and walkways.

Preference is given to the use of a bead foam of the invention for the production of a molded body for shoe intermediate soles, shoe insoles, shoe combisoles or a cushioning element for shoes. The shoe here is preferably an outdoor shoe, sports shoe, sandal, boot or safety shoe, particularly preferably a sports shoe.

The present invention accordingly further also provides a molded body, where the molded body is a shoe combisole for shoes, preferably for outdoor shoes, sports shoes, sandals, boots or safety shoes, particularly preferably sports shoes.

The present invention accordingly further also provides a molded body, where the molded body is an intermediate sole for shoes, preferably for outdoor shoes, sports shoes, sandals, boots or safety shoes, particularly preferably sports shoes.

The present invention accordingly further also provides a molded body, where the molded body is an insert for shoes, preferably for outdoor shoes, sports shoes, sandals, boots or safety shoes, particularly preferably sports shoes.

The present invention accordingly further also provides a molded body, where the molded body is a cushioning element for shoes, preferably for outdoor shoes, sports shoes, sandals, boots or safety shoes, particularly preferably sports shoes.

The cushioning element here can by way of example be used heel region or frontal foot region. The present invention therefore also provides a shoe in which the molded body of the invention is used as midsole, intermediate sole or cushioning in, for example, heel region or frontal foot region, where the shoe is preferably an outdoor shoe, sports shoe, sandal, boot or safety shoe, particularly preferably a sports shoe.

Illustrative embodiments of the present invention are listed below, but do not restrict the present invention. In particular, the present invention also encompasses embodiments which result from the dependencies stated below, therefore being combinations:

1. A molded body made of bead foam, made of a composition (Z) comprising
   a) from 70 to 95% by weight of thermoplastic polyurethane as component I
   b) from 5 to 30% by weight of the styrene polymer as component II,
   where the entirety of components I and II provides 100% by weight;
   wherein the molded body is an intermediate sole for shoes, an insert for shoes or a cushioning element for shoes.

2. The molded body according to embodiment 1, where the composition Z comprises
   a) from 80 to 90% by weight of thermoplastic polyurethane as component I
   b) from 10 to 20% by weight of the styrene polymer as component II,
   where the entirety of components I and II provides 100% by weight.

3. The molded body according to embodiment 1, where the polystyrene is atactic polystyrene.

4. The molded body according to any of embodiments 1 to 3, where the molded body is an intermediate sole for shoes.

5. The molded body according to any of embodiments 1 to 3, where the molded body is an insert for shoes.

6. The molded body according to any of embodiments 1 to 3, where the molded body is a cushioning element for shoes.

7. The molded body according to any of embodiments 1 to 6, where the shoe is an outdoor shoe, sports shoe, sandal, boot or safety shoe.

8. The molding according to any of embodiments 1 to 6, where the shoe is a sports shoe.

9. The molded body made of bead foam according to any of embodiments 1 to 8, wherein the tensile strength of the molded body is above 600 kPa.
10. The molded body according to embodiment 9, wherein elongation at break is above 100%.
11. The molded body according to embodiment 9 or 10, wherein compressive stress at 10% compression is above 15 kPa.
12. The molded body according to any of embodiments 9 to 11, wherein the density of the molded body is from 75 to 375 kg/m$^3$.
13. The molded body according to any of embodiments 9 to 12, wherein the density of the molded body is from 100 to 300 kg/m$^3$.
14. The molded body according to any of embodiments 9 to 13, wherein the density of the molded body is from 150 to 200 kg/m$^3$.
15. The molded body according to any of embodiments 9 to 14, wherein the rebound resilience of the molded body is above 55%.
16. The molded body according to any of embodiments 9 to 15, wherein the ratio of the density of the molding to the bulk density of the bead foam is from 1.5 to 2.5.
17. The molded body made of bead foam according to any of embodiments 9 to 16, wherein the ratio of the density of the molding to the bulk density of the bead foam is from 1.8 to 2.0.
18. A process for the production of a molded body according to any of embodiments 1 to 17 comprising
    (i) introduction of the foam beads into an appropriate mold,
    (ii) fusion of the foam beads from step (i).
19. The process according to claim 18, wherein the fusion in step (ii) is achieved in a closed mold.
20. The process according to claim 18 or 19, wherein the fusion in step (ii) is achieved by means of steam, hot-air or high-energy radiation.
21. A shoe comprising a molded body according to any of embodiments 1 to 17.
22. The shoe according to embodiment 21, wherein the shoe is an outdoor shoe, sports shoe, sandal, boot or safety shoe.
23. The shoe according to embodiment 22, wherein the shoe is a sports shoe.
24. The use of a bead foam with a composition according to any of embodiments 1 to 3 for the production of a molded body according to any of embodiments 1 to 17 for shoe intermediate soles, shoe insoles, shoe combisoles, cushioning elements for shoes, bicycle saddles, bicycle tires, damping elements, cushioning, mattresses, underlays, grips, protective films, in components in the automobile-interior sector or automobile-exterior sector, balls and sports equipment, or as floorcovering.
25. The use according to embodiment 24 for shoe intermediate soles, shoe insoles, shoe combisoles, or cushioning elements for shoes, wherein the shoe is an outdoor shoe, sports shoe, sandal, boot or safety shoe.
26. The use according to embodiment 24, where the shoe is a sports shoe.

The examples below serve to illustrate the invention, but are in no way restrictive in respect of the subject matter of the present invention.

EXAMPLES

The expanded beads made of thermoplastic polyurethane and of the styrene polymer were produced by using a twin-screw extruder with screw diameter 44 mm and length-to-diameter ratio 42 with attached melt pump, a diverter valve with screen changer, a pelletizing die and an underwater pelletization system. In accordance with processing guidelines, the thermoplastic polyurethane was dried for 3 h at 80° C. prior to use in order to obtain residual moisture content below 0.02% by weight. In order to prevent introduction of moisture via the styrene polymer, quantities used of which were likewise significant, this was likewise dried for 3 h at 80° C. to residual moisture content below 0.05% by weight. 0.9% by weight, based on the thermoplastic polyurethane used, of a thermoplastic polyurethane to which diphenylmethane 4,4'-diisocyanate with average functionality 2.05 had been admixed in a separate extrusion process was added to each example, alongside the two abovementioned components.

Thermoplastic polyurethane used was an ether-based TPU from BASF (Elastollan 1180 A or Elastollan 1185 A) with a Shore hardness 80 A or 85 A according to the data sheet. The styrene polymer used was a PS 158 K Q from BASF with modulus of elasticity 3317 MPa measured in the tensile test according to data sheet or a PS 148 H from BASF with modulus of elasticity 3300 MPa measured in the tensile test according to datasheet.

The thermoplastic polyurethane, the polystyrene, and also the thermoplastic polyurethane to which diphenylmethane 4,4'-diisocyanates have been admixed were respectively metered separately into the intake of the twin-screw extruder by way of gravimetric metering devices. Table 1 lists the proportions by weight of the thermoplastic polyurethane, inclusive of the thermoplastic polyurethane to which diphenylmethane 4,4'-diisocyanate had been admixed, and the polystyrene.

TABLE 1

Proportions by weight of thermoplastic polyurethane and polystyrene in the inventive examples and comparative examples

| Example (E)/ Comparative Example (CE) | Elastollan 1180 A [% by wt.] | Elastollan 1185 A [% by wt.] | PS 158 K Q [% by wt.] | PS 148 H [% by wt.] |
|---|---|---|---|---|
| E1 | 90 | 0 | 10 | 0 |
| E2 | 85 | 0 | 15 | 0 |
| E3 | 80 | 0 | 20 | 0 |
| E4 | 70 | 0 | 30 | 0 |
| E5 | 95 | 0 | 5 | 0 |
| E6 | 92.5 | 0 | 7.5 | 0 |
| E7 | 90 | 0 | 0 | 10 |
| E8 | 85 | 0 | 0 | 15 |
| E9 | 80 | 0 | 0 | 20 |
| E10 | 0 | 85 | 15 | 0 |
| CE1 | 65 | 0 | 35 | 0 |

The materials were metered into the intake of the twin-screw extruder and then melted and mixed with one another. After mixing, a mixture of $CO_2$ and $N_2$ was added as blowing agent. During passage through the remainder of the length of the extruder, the blowing agent and the polymer melt were mixed with one another to form a homogeneous mixture. The total throughput of the extruder, including the TPU, the TPU, to which diphenylmethane 4,4'-diisocyanate with average functionality 2.05 had been added in a separate extrusion process, the polystyrene and the blowing agents, was 80 kg/h.

A gear pump (GP) was then used to force the melt mixture by way of a diverter valve with screen changer (DV) into a pelletizing die (PD), and said mixture was chopped in the cutting chamber of the underwater pelletization system (UP)

to give pellets and transported away by the temperature-controlled and pressurized water, and thus expanded. A centrifugal dryer was used to ensure separation of the expanded beads from the processed water.

Table 2 lists the plant-component temperatures used. Table 3 shows the quantities used of blowing agent ($CO_2$ and $N_2$), the quantities being adjusted in each case to give the lowest possible bulk density. The quantitative data for the blowing agents are based on the total throughput of polymer.

TABLE 2

Plant-component temperature data

|  | Temperature range in extruder (° C.) | Temperature range of GP (° C.) | Temperature range of DV (° C.) | Temperature range of PD (° C.) | Water pressure in UP (bar) | Water temperature in UP (° C.) |
|---|---|---|---|---|---|---|
| E1 | 220-170 | 150 | 150 | 220 | 15 | 40 |
| E2 | 220-170 | 145 | 145 | 220 | 15 | 40 |
| E3 | 220-170 | 145 | 145 | 220 | 15 | 40 |
| E4 | 220-165 | 145 | 145 | 220 | 15 | 40 |
| E5 | 220-170 | 150 | 150 | 220 | 15 | 40 |
| E6 | 220-170 | 155 | 155 | 220 | 15 | 40 |
| E7 | 220-170 | 145 | 145 | 220 | 15 | 40 |
| E8 | 220-170 | 155 | 155 | 220 | 15 | 45 |
| E9 | 220-170 | 155 | 155 | 220 | 15 | 40 |
| E10 | 230-180 | 180 | 180 | 220 | 15 | 50 |
| CE1 | 220-165 | 145 | 145 | 220 | 15 | 40 |

TABLE 3

Quantities added of blowing agents, based on total throughput of polymer

|  | $CO_2$ [% by wt.] | $N_2$ [% by wt.] |
|---|---|---|
| E1 | 2.2 | 0.1 |
| E2 | 2.2 | 0.1 |
| E3 | 2.2 | 0.15 |
| E4 | 2.2 | 0.15 |
| E5 | 1.9 | 0.1 |
| E6 | 2.15 | 0.1 |
| E7 | 1.9 | 0.15 |
| E8 | 1.9 | 0.15 |
| E9 | 1.9 | 0.15 |
| E10 | 2.0 | 0.15 |
| CE1 | 2.2 | 0.15 |

Table 4 lists the bulk densities of the expanded pellets resulting from each of the inventive examples and comparative examples.

TABLE 4

Bulk density measured for expanded beads after at least 3 h of storage time

|  | Bulk density (g/l) |
|---|---|
| E1 | 148 ± 6 |
| E2 | 155 ± 10 |
| E3 | 175 ± 5 |
| E4 | 192 ± 5 |
| E5 | 148 ± 4 |
| E6 | 154 ± 5 |
| E7 | 138 ± 7 |
| E8 | 139 ± 5 |
| E9 | 190 ± 3 |
| E10 | 170 ± 7 |
| CE1 | 215 ± 4 |

CITED LITERATURE

WO 94/20568 A1
WO 2007/082838 A1,
WO2 017/030835 A1
WO 2013/153190 A1
WO 2010/010010 A1
PCT/EP2017/079049
Plastics Additives Handbook, 5th Edition, H. Zweifel, edn., Hanser Publishers, Munich, 2001 ([1]), pp. 98-136
Kunststoff-Handbuch Band 4, "Polystyrol" [Plastics handbook vol. 4, "Polystyrene"], by Becker/Braun (1996)
Saechtling (ed.), Kunststoff-Taschenbuch [Plastics handbook], 27th edn., Hanser-Verlag Munich 1998, chapters 3.2.1 and 3.2.4
WO 2014/150122 A1
WO 2014/150124 A1
EP 1979401 B1
US 2015/0337102 A1
EP 2872309 B1
EP 3053732 A
WO 2016/146537 A1

The invention claimed is:

1. A molded body made of bead foam, the bead foam made of a composition (Z) comprising:
from 70 to 95% by weight of a thermoplastic polyurethane having a molecular weight Mw of 60,000 to 300,000 g/mol as determined by gel permeation chromatography as component I, and
from 5 to 30% by weight of a styrene polymer having a modulus of elasticity in tension of above 2,500 MPa according to DIN EN ISO 527-1/2, June 2012, as component II,
wherein the entirety of components I and II provides 100% by weight;
the molded body is at least one selected from the group consisting of an intermediate sole for a shoe, an insert for a shoe, and a cushioning element for a shoe and
a tensile strength of the molded body is above 600 kPa.

2. The molded body according to claim 1, wherein the composition Z comprises
from 80 to 90% by weight of the thermoplastic polyurethane as component I, and
from 10 to 20% by weight of the styrene polymer as component II.

3. The molded body according to claim 1, wherein the shoe is at least one selected from the group consisting of an outdoor shoe, a sports shoe, a sandal, a boot and a safety shoe.

4. The molded body according to claim 1, wherein the elongation at break of the molded body is above 100%.

5. The molded body according to claim 1, wherein the compressive stress of the molded body at 10% compression is above 15 kPa.

6. The molded body according to claim 1, wherein the density of the molded body is from 75 to 375 kg/m$^3$.

7. The molded body according to claim 1, wherein the rebound resilience of the molded body is above 55%.

8. The molded body according to claim 1, wherein the ratio of the density of the molded body to the bulk density of the bead foam is from 1.5 to 2.5.

9. A process for the production of a molded body according to claim 1, comprising
introducing the bead foam into a mold, and
fusing the bead foam after the introducing.

10. The process according to claim 9, wherein the fusing is achieved in a closed mold.

11. The process according to claim 9, wherein the fusing is achieved by means of at least one selected from the group consisting of steam, hot air, and high-energy radiation.

12. A shoe, comprising a molded body according to claim 1.

13. A molded body comprising a bead foam, the bead foam comprising:
- from 70 to 95% by weight of a thermoplastic polyurethane having a molecular weight Mw of 60,000 to 300,000 g/mol as determined by gel permeation chromatography as component I, and
- from 5 to 30% by weight of a styrene polymer having a modulus of elasticity in tension of above 2,500 MPa according to DIN EN ISO 527-1/2, June 2012, as component II,
- wherein the entirety of components I and II provides 100% by weight;
- a tensile strength of the molded body is above 600 kPa, and
- the molded body is a whole or a part of at least one selected from the group consisting of a shoe intermediate sole, a shoe insole, a shoe combisole, a cushioner for a shoe, a bicycle saddle, a bicycle tire, a damping element, a cushioning, a mattress, an underlay, a grip, a protective film, a component in the automobile interior sector, a component in the automobile exterior sector, a ball, a sport equipment, and a floorcovering.

14. The molded body according to claim 13, which is a whole or a part of at least one selected from the group consisting of a shoe intermediate sole, a shoe insole, a shoe combisole, and a cushioner for a shoe,
- wherein the shoe is at least one selected from the group consisting of an outdoor shoe, a sports shoe, a sandal, a boot, and a safety shoe.

\* \* \* \* \*